(12) United States Patent
de Souza et al.

(10) Patent No.: US 6,925,421 B2
(45) Date of Patent: Aug. 2, 2005

(54) METHOD, SYSTEM, AND COMPUTER PROGRAM PRODUCT FOR ESTIMATING THE NUMBER OF CONSUMERS THAT PLACE A LOAD ON AN INDIVIDUAL RESOURCE IN A POOL OF PHYSICALLY DISTRIBUTED RESOURCES

(75) Inventors: Ravin Luis de Souza, Austin, TX (US); David William Sheffield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 10/339,759

(22) Filed: Jan. 9, 2003

(65) Prior Publication Data

US 2004/0138857 A1 Jul. 15, 2004

(51) Int. Cl.[7] .............................................. G06F 19/00
(52) U.S. Cl. ......................................... 702/186; 700/32
(58) Field of Search .......................... 702/186, 60, 64, 702/117, 118; 700/32, 95; 438/14, 17; 365/227; 716/2, 10

(56) References Cited

U.S. PATENT DOCUMENTS

| | | | | |
|---|---|---|---|---|
| 5,359,524 A | * | 10/1994 | Rohan | ........................ 700/99 |
| 6,216,252 B1 | * | 4/2001 | Dangelo et al. | ................ 716/1 |
| 6,249,902 B1 | * | 6/2001 | Igusa et al. | ..................... 716/10 |
| 6,608,791 B2 | * | 8/2003 | Watanabe et al. | ............ 365/211 |
| 6,643,193 B2 | * | 11/2003 | Yamaki et al. | .......... 365/189.09 |
| 6,694,218 B2 | * | 2/2004 | Oh | .............................. 700/217 |

* cited by examiner

Primary Examiner—Edward Raymond
(74) Attorney, Agent, or Firm—Duke W. Yee; Mark E. McBurney; Lisa L. B. Yociss (57) ABSTRACT

A method, system, and product are described for estimating the number of consumers that place a load on an individual resource belonging to a pool of resources that are physically distributed through a data processing system. The resources and consumers are physically distributed throughout a semiconductor substrate of the data processing system. A definition of the load on a particular resource in the pool of resources is described in terms of the number of consumers that could be said to have all of their resource requests satisfied only by that particular resource. A method is described by which this number can be estimated. In this method, a relative size of a portion of the resources is determined with respect to a total size of all of the resources. A load placed on the portion of the resources by the consumers is estimated utilizing the determined relative size and a value of a total quantity of the consumers.

19 Claims, 4 Drawing Sheets

100 DATA PROCESSING SYSTEM

METHOD, SYSTEM, AND COMPUTER PROGRAM PRODUCT FOR ESTIMATING THE NUMBER OF CONSUMERS THAT PLACE A LOAD ON AN INDIVIDUAL RESOURCE IN A POOL OF PHYSICALLY DISTRIBUTED RESOURCES

BACKGROUND OF THE INVENTION

1. Technical Field

The present invention relates generally to the field of computer systems and, more specifically, to a method, system, and computer program product for estimating the number of consumers that place a load on an individual resource that belongs to a pool of resources that are physically distributed throughout a semiconductor substrate within a data processing system.

2. Description of Related Art

Current data processing systems typically have a uniform environment where all memory is physically equidistant from each processor in the system. In these systems, all of the processors take the same amount of time to access each memory location. In order to make programming decisions regarding how to manage the memory in the system, all processors may be considered by the system to be consumers of all of the memory resources in the system.

Some systems, however, have system memory that is distributed throughout the semiconductor substrate in physically separate memory banks. The distributed memory banks will each have different access times for different groups of processors. Thus, a processor will have a different access time for one memory bank in comparison to another memory bank. A memory request by a processor can be satisfied from any memory bank. In the management of distributed system memory, programming decisions have to be made on a bank by bank basis. It cannot be assumed that the load on each memory bank comes from all of the processors in the system. Further, it also cannot be assumed that only the processors that are physically closest to a particular memory bank will be the only ones to place a load on that memory bank.

Therefore, a need exists for a method, system, and computer program product for estimating the number of consumers that place a load on an individual resource in a pool of resources that are physically distributed through a data processing system.

SUMMARY OF THE INVENTION

A method, system, and product are described for estimating the number of consumers that place a load on an individual resource belonging to a pool of resources that are physically distributed throughout a semiconductor substrate. The resources and consumers are physically distributed throughout a semiconductor substrate of the data processing system. A definition of the load on a particular resource in the pool of resources is described in terms of the number of consumers that could be said to have all of their resource requests satisfied only by that particular resource. A method is described by which this number can be estimated. In this method, a relative size of a portion of the resources is determined with respect to a total size of all of the resources. A load placed on the portion of the resources by the consumers is estimated utilizing the determined relative size and a value of a total quantity of the consumers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and computer program product for estimating the number of consumers that place a load on an individual resource in a pool of resources that are physically distributed throughout a semiconductor substrate of a data processing system.

The data processing system of the present invention includes a plurality of consumers, such as processors, that are physically distributed throughout the system. Typically, these processors are physically distributed throughout a single semiconductor substrate. These processors may be clustered in groups in the semiconductor substrate such that the groups are distributed throughout the substrate. The physical location of these groups may greatly affect the access time required when a processor in the cluster accesses a memory location. These processors may access any memory location within the system's memory.

In addition, the system's memory may be distributed physically throughout the semiconductor substrate in memory banks. In this manner, particular processors may be located physically closer to some memory banks than to other memory banks. A processor may have its memory requests satisfied by any memory bank in the system, and not necessarily by the memory bank that is physically closest to the processor.

The location which is used to satisfy a processor's request is dependent on the current state of utilization of the system memory banks, the order in which memory banks are searched, and the size of each memory bank among other things.

A cluster of processors is defined herein as a group of processors that each have the same access time to any particular memory bank. All processors in a particular processor group will have the same access time to any location within a particular memory bank. This is true for each processor and each memory bank. Thus, a memory bank is a range of physical memory locations to which any processor within the system takes the same time to access all memory locations within that range.

The following is an example of a typical application of the present invention. Data structures must be constructed in order to manage memory resources. These data structures need to be scaled according to the demand, or load, placed on their associated memory resources. As the demand increases, the number of these data structures must increase in order to efficiently manage the associated memory resource in order to minimize the amount of time the consumers, such as processors, must wait in order to access the memory resource.

In accordance with the prior art, the environment was uniform. All memory was equidistant from each processor in the system. This created a system where there was effectively only one memory bank and where each processor had the same access time for each memory location in that memory bank. In the prior art it was relatively simple to calculate the number of consumers that place a load on the system memory resources. This number was simply all of the processors in the system.

In accordance with the present invention, the resources, including memory and processors, are physically distributed throughout a semiconductor substrate. The resources are physically grouped together in clusters and have non-uniform access times. This makes a determination of the load on a memory bank much more complicated. A processor memory request can be satisfied from any memory bank in the system, so it cannot simply be assumed that the cluster of processors that are closest to a memory bank will be the consumers, or load, on that memory bank.

There is a need, therefore, to have a definition of what can be considered to be the number of processors that place a load on a particular memory bank. This number is defined as the sum over all of the system processors of the fraction of each processor's total memory requests that are satisfied on a particular memory bank. This number is referred to herein as the effective processor count of a memory bank, or "Ecpus". The Ecpus count of a memory bank is a load estimate which can be thought of as the number of processors that could be said as having all of their memory requests satisfied only by that particular memory bank.

A lot of factors determine how memory requests, generated by processors, are satisfied by the system memory. These include the workload running on the system and its distribution among the processors, the way the memory banks are ordered and searched, the size of the memory banks, and the interaction with page replacement and memory allocation requests. Due to these and other factors, it is not possible to know before hand what the distribution of memory accesses will be among the system processors and on which memory banks the requests will get satisfied. It is therefore not possible to arrive beforehand, or before the system has run its workload, at an accurate number for the effective processor count of a memory bank.

Thus, the present invention provides a method, system, and computer program product for estimating an effective processor count, Ecpus, which is an estimation of the load in terms of the number of consumers, such as processors on an individual resource, such as a memory bank, in the system.

The effective processor count, Ecpus is determined as follows:

$$E_{cpus}(y) = [(\text{size of memory bank } y)/(\text{size of total system memory}) \times (\text{number of processors in the system})].$$

The effective processor count is determined by assuming a workload wherein all processors generate the same number of memory requests and that all of the system memory is used. Thus, after a given interval of time, each processor will have requested the same amount of memory. The count equation is derived as follows:

Let K be the total number of memory requests made by a processor in the system.

Let $M_{xy}$ be the total memory that is allocated by processor x on memory bank y.

Let $N_{cpus}$ be the total number of processors in the system.

Then $E_{cpus(y)} = [(M_{0y}/K) + (M_{1y}/K) + (M_{2y}/K) + \ldots ]$.

Since $[(M_{0y}) + (M_{1y}) + (M_{2y}) + \ldots ]$ is the size of memory bank y and because K=(size of system memory/$N_{cpus}$), then $$E_{cpus(y)} = [(\text{size of memory bank } y)/(\text{size of system memory})] * (N_{cpus}).$$

The following is an example of the application of the present invention. The AIX operating system available from International Business Machines provides a virtual memory manager. The operating system uses data structures called "mempools" to manage the free memory in each memory bank. All of the mempool data structures used to manage the free memory in one memory bank are grouped together to form a "vmpool".

A mempool serve two purposes. First, they are used to satisfy page requests for memory in the memory bank that they manage. With a greater number of mempools, more page requests are capable of being satisfied simultaneously. Second, a mempool is a page replacement entity. When all of the free memory in the system has been used up, pages that have been already allocated need to be freed in order to satisfy additional page requests. The page replacement daemons that free up allocated memory work on a mempool granularity. With a greater number of mempools, pages would be replaced at a faster rate.

Therefore, it is necessary to decide how many mempools are required per memory bank. The number of mempools for a memory bank depends directly on the percentage of page requests generated in the system that arrive at the memory bank to be satisfied. Since page requests are generated by processors, the number of processors that place a load on a memory bank must be determined.

The present invention may be used to estimate, independent of factors influencing resource allocation, the number of processors, that could be regarded as having all of their memory requests effectively satisfied on a particular memory bank. This number can be then used in making programming decisions regarding the number of mempools needed to efficiently manage the memory bank resource.

Figure 1:
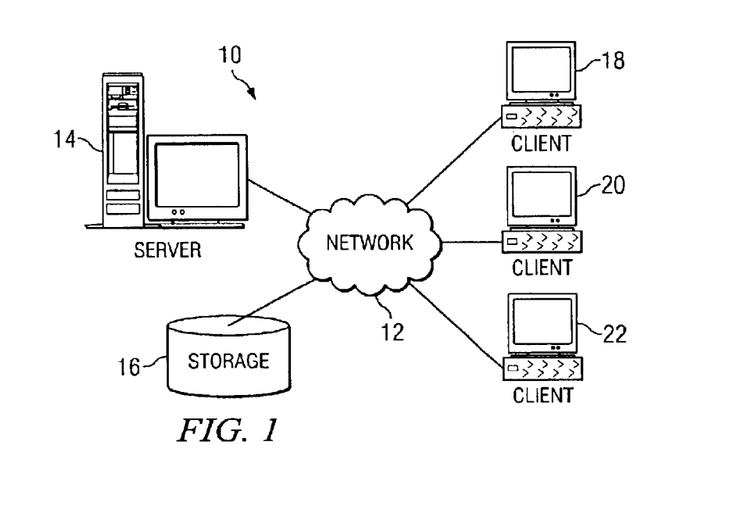
FIG. 1 depicts a pictorial representation of a network of data processing systems in which the present invention may be implemented.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
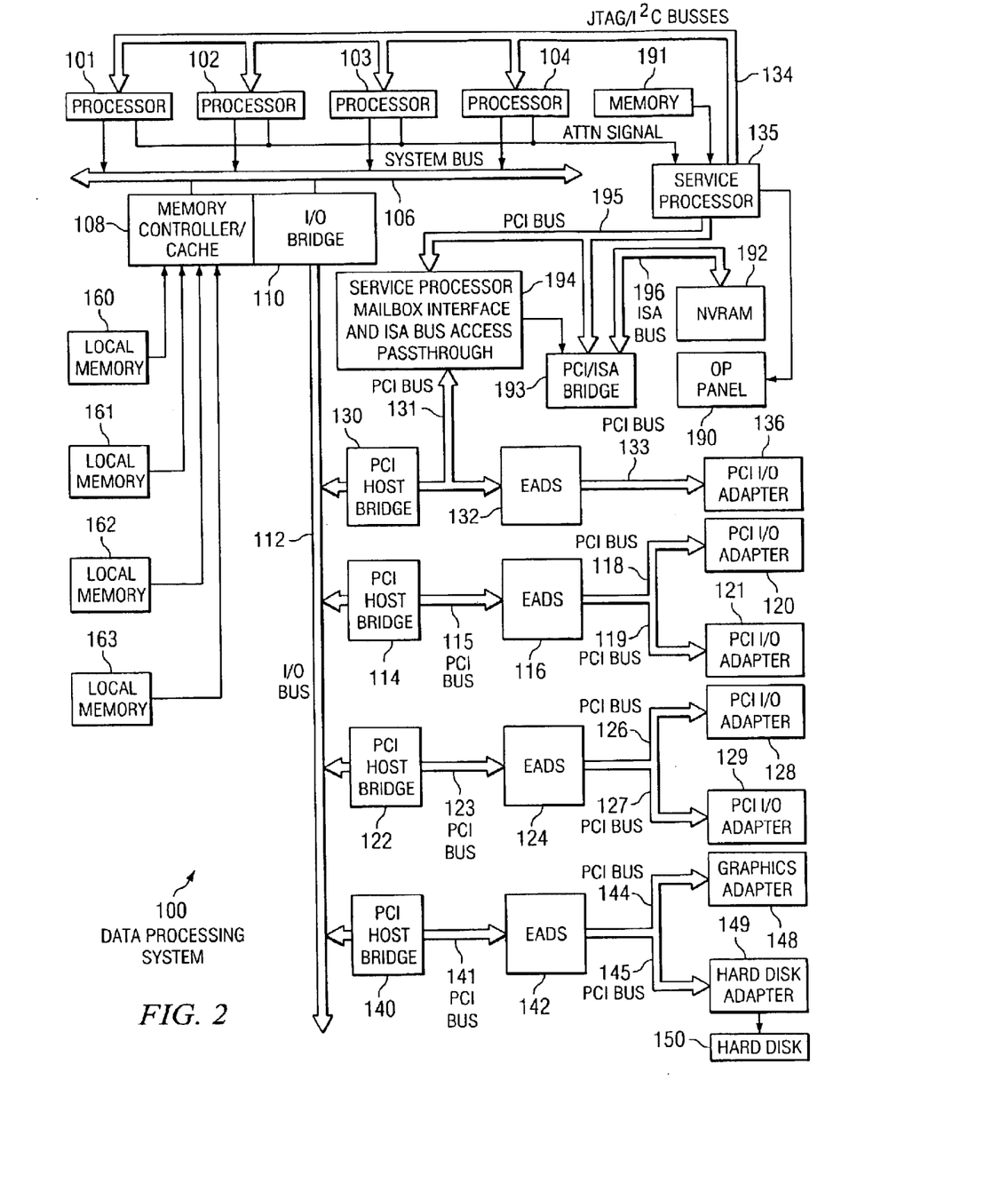
FIG. 2 illustrates a logical block diagram of a data processing system in which the present invention may be implemented in accordance with the present invention.

FIG. 2 illustrates a block diagram of a data processing system in which the present invention may be implemented in accordance with the present invention. Data processing system 100 includes a plurality of processors 101, 102, 103, and 104 connected to system bus 106. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage is connected to the ISA bus 196. The service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
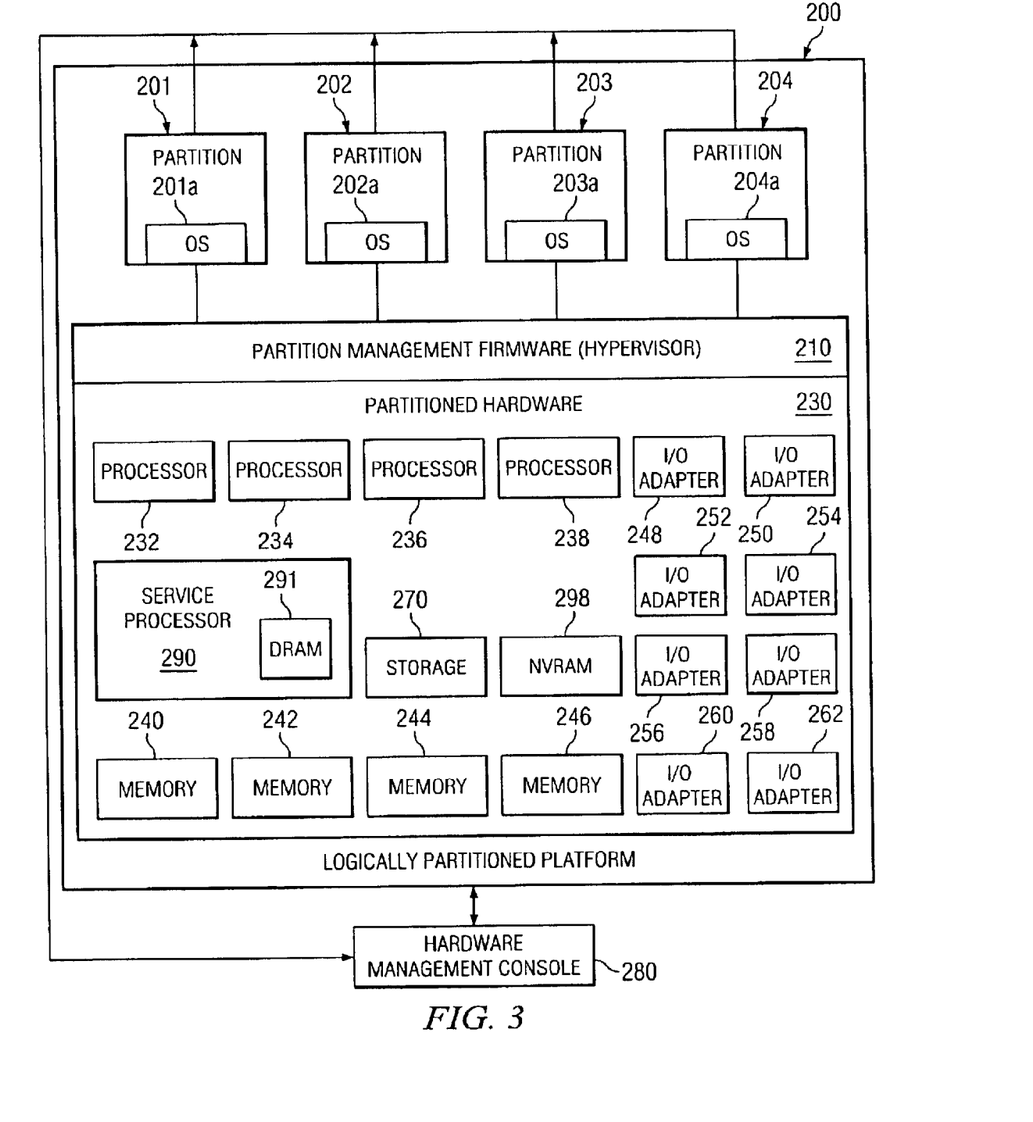
FIG. 3 depicts a logical block diagram of a logically partitioned platform in accordance with the present invention.

FIG. 3 illustrates a block diagram of an exemplary logically partitioned platform in accordance with the present invention. Logically partitioned platform 200 includes partitioned hardware (also called the base hardware) 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–203 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware management console (HMC) 280 may be coupled to data processing system 100 which includes logically partitioned platform 200. HMC 280 is a separate computer system that is coupled to logically partitioned platform 200 and may be used by a user to control various functions of data processing system 100. HMC 280 includes a graphical user interface (GUI) which may be used by a user to select a partition to be rebooted.

Figure 4:
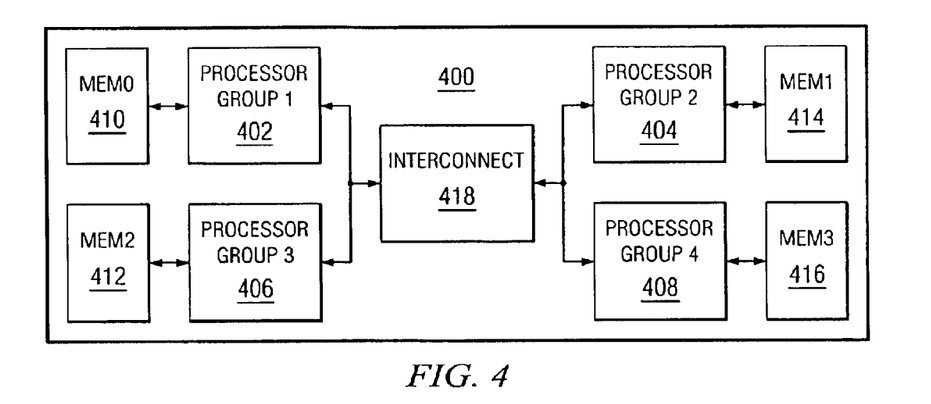
FIG. 4 is a block diagram of a physical layout of distributed resources and consumers within a semiconductor substrate in accordance with the present invention.

FIG. 4 is a block diagram of a physical layout of resources and consumers distributed throughout a semiconductor substrate 400 in accordance with the present invention. Processors are clustered into processor groups. Four groups of processors are coupled to four different memory banks through an interconnect 418. Each group of processors includes one or more processors that are located in a particular physical location. The groups are physically distributed throughout substrate 400 such that the groups are in different physical locations. Each group may be separated from the other groups by a large physical distance. The memory banks are also physically distributed throughout substrate 400 such that the banks are in different physical locations. Each memory bank may be separated from the other memory banks by a large physical distance. Further, one or more processor groups may be located physically closer to one or more memory banks than the other memory banks.

Processors in any processor group can access any memory location in any memory bank in the system. However, a processor will have a shorter access time to memory bank(s) that are physically closer to the processor than to banks that are physically further away. FIG. 4 depicts each processor group being coupled to the memory bank that is physically closest to that processor group. However, any processor in any processor group may access any memory location in any memory bank. The other connections that depict each processor group being coupled to each memory bank are not illustrated by FIG. 4.

FIG. 4 depicts system memory that is located in four different memory banks. Each memory bank includes memory locations that are distinct from the other memory banks. The system memory is contiguous. As illustrated, the system memory starts from memory location 0 and is distributed such that MEM0 includes locations 0–4 GB, MEM1 includes locations 4 GB–8 GB, MEM2, includes locations 8 GB–12 GB, and MEM3 includes locations 12 GB–16 GB.

For example, as depicted by FIG. 4, processor group 1, group 402, is physically closest to and thus has a shorter access time to MEM0, memory bank 410. Processor group 2, group 401, is physically closest to and therefore has a shorter access time to MEM1, memory bank 414. Processor group 3, group 406, is physically closest to and thus has a shorter access time to MEM2, memory bank 412. And, processor group 4, group 408, is physically closest to and therefore has a shorter access time to MEM3, memory bank 416.

Figure 5:
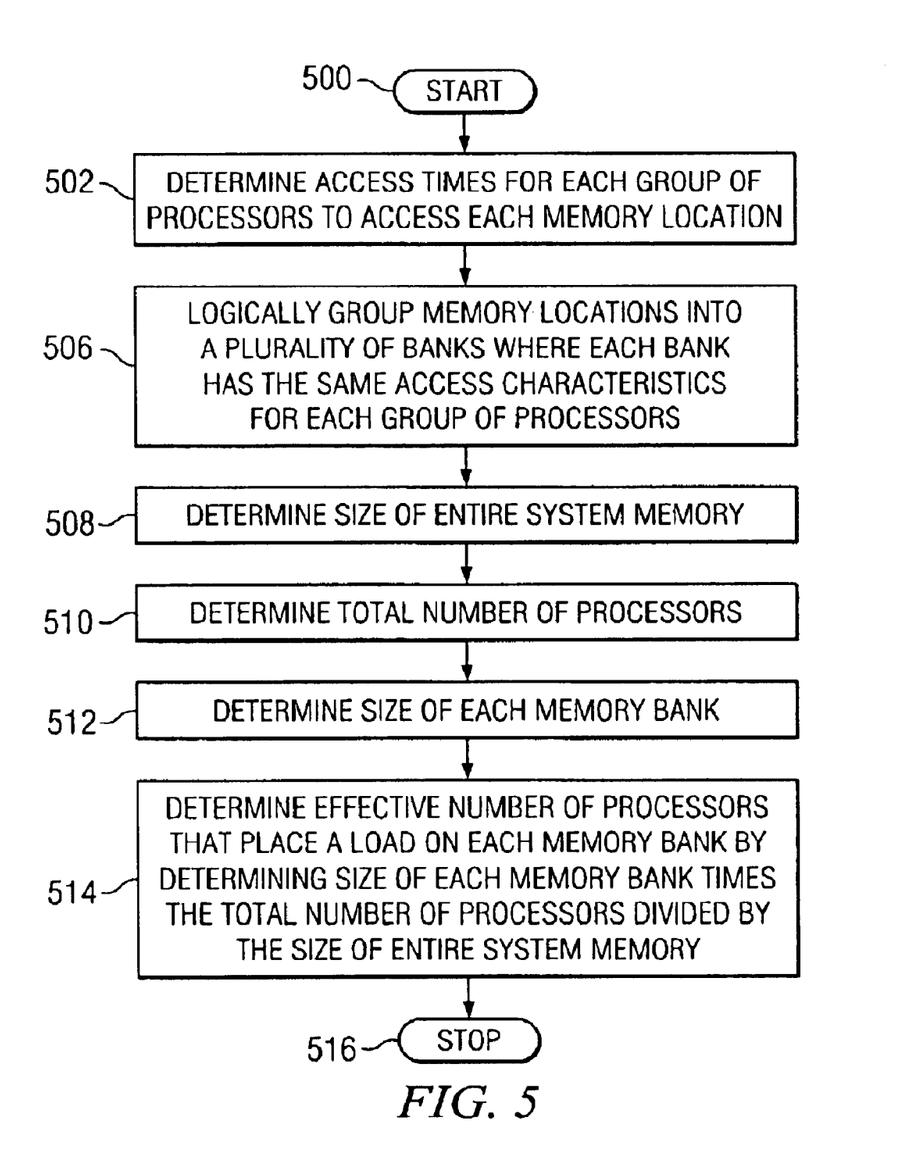
FIG. 5 depicts a high level flow chart which illustrates estimating the number of consumers that place a load on an individual resource in a pool of resources that are physically distributed throughout a semiconductor substrate in accordance with the present invention.

FIG. 5 depicts a high level flow chart which illustrates estimating a load on a plurality of resources by a plurality of distributed devices in accordance with the present invention. The process starts as depicted by block 500 and thereafter passes to block 502 which illustrates determining access times for each device, such as a processor, to access each portion of the plurality of resources, such as each memory location of a system memory.

The process then passes to block 506 which illustrates logically grouping memory locations into a plurality of different banks where each memory bank provides the same access characteristics for each processor. Thereafter, block 508 depicts determining the total size of the entire system memory including all memory banks. Block 510, then, illustrates determining the total number of processors. The process then passes to block 512 which depicts determining the size of each memory bank. Thereafter, block 514 illustrates determining an effective number of processors that place a load on each memory bank. The effective number of processors is determined for a particular memory bank by determining the size of the memory bank times the total number of processors divided by the size of the entire system memory. The process then terminates as depicted by block 516.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for determining the memory request load placed on one of a plurality of physically separate memory banks by a plurality of processors, said plurality of memory banks and said plurality of processors being physically distributed throughout a semiconductor substrate in said data processing system, said method comprising the steps of:

one of said plurality of processors being located physically closer to one of said plurality of memory banks than to others of said plurality of memory banks, an access time for said one of said plurality of processors to access said one of said plurality of memory banks being different from an access time for said one of said plurality of processors to access said others of said plurality of memory banks;

determining a relative size of one of said plurality of memory banks with respect to a total size of all of said plurality of memory banks; and estimating a load placed on said one of said plurality of memory banks by determining a number of said plurality of processors that have all of their memory requests satisfied by said one of said plurality of memory banks utilizing said determined relative size and a value of a total quantity of said plurality of processors.

2. The method according to claim 1, further comprising:

grouping said plurality of processors in physically separate clusters;

each processor within a cluster having the same access time for accessing one of said plurality of memory banks; and distributing said clusters throughout said semiconductor substrate, one of said clusters being located physically closer to one of said plurality of memory banks than to others of said plurality of memory banks, an access time for any processor included in said one of said clusters to access said one of said plurality of memory banks being different from an access time for any processor included in said one of said clusters to access said others of said plurality of memory banks.

3. The method according to claim 2, further comprising:

satisfying a memory request by one of said processors included in said one of said clusters utilizing one of said others of said plurality of memory banks that is not physically closest to said one of said clusters.

4. The method according to claim 1, further comprising the steps of:

determining a relative size of said one of said plurality of memory banks with respect to a total size of all of said plurality of memory banks; and estimating said number of said plurality of processors that have all of their memory requests satisfied by said one of said plurality of memory banks by multiplying said determined relative size of said one of said plurality of memory banks times a value that is equal to a total number of said plurality of processor.

5. A method in a data processing system for determining the memory request load placed on one of a plurality of memory requests by a plurality of processors, said plurality of memory banks and said plurality of processors physically distributed throughout a semiconductor substrate included in said data processing system, said method comprising the steps of:

one of said plurality of processors being located physically closer to one of said plurality of memory banks than to others of said plurality of memory banks, an access time for said one of said plurality of processors to access said one of said plurality of memory banks being different from an access time for said one of said plurality of processors to access said others of said plurality of memory banks;

estimating a load placed on said one of said plurality of memory banks by estimating, for each one of said plurality of processors, a fraction of memory requests made by each one of said plurality of processors to said one of said plurality of memory banks; and estimating a total load placed on said one of said plurality of memory banks utilizing said estimation of said load placed on said one of said plurality of memory banks by each one of said plurality of processors.

6. The method according to claim 5, further comprising:

grouping said plurality of processors in physically separate clusters;

each processor within a cluster having the same access time for accessing one of said plurality of memory banks; and distributing said clusters throughout said semiconductor substrate, one of said clusters being located physically closer to one of said plurality of memory banks than to others of said plurality of memory banks, an access time for any processor included in said one of said clusters to access said one of said plurality of memory banks being different from an access time for any processor included in said one of said clusters to access said others of said plurality of memory banks.

7. The method according to claim 6, further comprising:
satisfying a memory request by one of said processors included in said one of said clusters utilizing one of said others of said plurality of memory banks that is not physically closest to said one of said clusters.

8. The method according to claim 5, further comprising the steps of:
estimating a total load placed on said one of said plurality of memory banks by all of said plurality of processors by generating a sum of each estimated fraction of memory requests made by each one of said plurality of processors to said one of said plurality of memory banks.

9. A data processing system for determining the memory request load placed on one of a plurality of physically separate memory banks by a plurality of processors, said plurality of memory banks and said plurality of processors being physically distributed throughout a semiconductor substrate in said data processing system, said system comprising:
one of said plurality of processors being located physically closer to one of said plurality of memory banks than to others of said plurality of memory banks, access time for said one of said plurality of processors to access said one of said plurality of memory banks being different from an access time for said one of said plurality of processors to access said others of said plurality of memory banks;
determining means for determining a relative size of one of said plurality of memory banks with respect to a total size of all of said plurality of memory banks; and
estimating means for estimating a load placed on said one of said plurality of memory banks by determining a number of plurality of processors that have all of their memory requests satisfied by said one of said plurality of memory banks utilizing said determined relative size and a value of a total quantity of said plurality of processors.

10. The system according to claim 9, further comprising:
said plurality of processors grouped in physically separate clusters;
each processor within a cluster having the same access time for accessing one of said plurality of memory banks; and
said clusters distributed throughout said semiconductor substrate, one of said clusters being located physically closer to one of said plurality of memory banks than to others of said plurality of memory banks, an access time for any processor included in said one of said clusters to access said one of said plurality of memory banks being different from an access time for any processor included in said one of said clusters to access said others of said plurality of memory banks.

11. The system according to claim 10,
a memory request by one of said processors included in said one of said clusters being satisfied utilizing one of said others of said plurality of memory banks that is not physically closest to said one of said clusters.

12. The system according to claim 9, further comprising:
determining means for determining a relative size of said one of said plurality of memory banks with respect to a total size of all of said plurality of memory banks; and
estimating means for estimating said number of said plurality of processors that have all of their memory requests satisfied by said one of said plurality of memory banks by multiplying said determined relative size of said one of said plurality of memory banks times a value that is equal to a total number of said plurality of processors.

13. A data processing system for determining the memory request load placed on one of a plurality of memory banks by a plurality of processors, said plurality of memory banks and said plurality of processors physically distributed throughout a semiconductor substrate included in said data processing system, said system comprising:
one of said plurality of processors being located physically closer to one of said plurality of memory bank than to others of said plurality of memory banks, an access time for said one of said plurality of processors to access said one of said plurality of memory banks being different from an access time for said one of said plurality of processors to access said others of said plurality of memory banks;
estimating means for estimating a load placed on said one of said plurality of memory banks by estimating, for each of said plurality of processors, a fraction of total memory requests made by each one of said plurality of processors to said one of said plurality of memory banks; and
estimating means for estimating a total load placed on said one of said plurality of memory banks utilizing said estimation of said load placed on said one of said plurality of memory banks by each one of said plurality of processors.

14. The system according to claim 13, further comprising:
said plurality of processors grouped in physically separate clusters;
each processor within a cluster having the same access time for accessing one of said plurality of memory banks; and
said clusters distributed throughout said semiconductor substrate, one of said clusters being located physically closer to one of said plurality of memory banks than to others of said plurality of memory banks, an access time for any processor included in said one of said clusters to access said one of said plurality of memory banks being different from an access time for any processor included in said one of said clusters to access said others of said plurality of memory banks.

15. The system according to claim 14, further comprising:
a memory request by one of said processors included in said one of said clusters being satisfied utilizing one of said others of said plurality of memory banks that is not physically closest to said one of said clusters.

16. The system according to claim 13, further comprising:
estimating means for estimating a total load placed on said one of said plurality of memory banks by all of said plurality of processors by generating a sum of each estimated fraction of memory requests made by each one of said plurality of processors to said one of said plurality of memory banks.

17. A computer program product in a data processing system for determining the memory request load placed on one of a plurality of memory banks by a plurality of processors, said plurality of memory banks and said plurality of processors physically distributed throughout a semiconductor substrate in said data processing system, said product comprising:

one of said plurality of processors being located physically closer to one of said plurality of memory banks than to others of said plurality of memory banks, an access time for said one of said plurality of processors to access said one of said plurality of memory banks being different from an access time for said one of said plurality of processors to access said others of said plurality of memory banks;

instruction means for determining a relative size of one of said plurality of memory banks with respect to a total size of all of said plurality of memory banks; and instruction means for estimating a load placed on said one of said plurality of memory banks by determining a number of said plurality of processors that have all of their memory request satisfied by said one of said plurality of memory banks utilizing said determined relative size and a value of a total quantity of said plurality of processors.

18. The product according to claim 17, further comprising:

grouping said plurality of processors in physically separate clusters;

each processor within a cluster having the same access time for accessing one of said plurality of memory banks;

distributing said clusters throughout said semiconductor substrate, one of said clusters being located physically closer to one of said plurality of memory banks than to others of said plurality of memory banks, an access time for any processor included in said one of said clusters to access said one of said plurality of memory banks being different from an access time for any processor included in said one of said clusters to access said others of said plurality of memory banks; and instructions for satisfying a memory request by one of said processors included in said one of said clusters utilizing one of said others of said plurality of memory banks that is not physically closest to said one of said clusters.

19. The product according to claim 17, further comprising:

instruction means for determining a relative size of said one of said plurality of memory banks with respect to a total size of all of said plurality of memory banks; and instruction means for estimating said number of said plurality of processors that have all of their memory requests satisfied by said one of said plurality of memory banks by multiplying said determined relative size of said one of said plurality of memory banks times a value that is equal to a total number of said plurality of processors.

* * * * *

UNITED STATES PATENT AND TRADEMARK OFFICE
CERTIFICATE OF CORRECTION

PATENT NO. : 6,925,421 B2 Page 1 of 1
APPLICATION NO. : 10/339759
DATED : August 2, 2005
INVENTOR(S) : de Souza et al.

It is certified that error appears in the above-identified patent and that said Letters Patent is hereby corrected as shown below:

Col. 11, line 46: before "plurality" insert --said--.

Col. 12, line 33: after "each" insert --one--.

Signed and Sealed this

Twenty-sixth Day of December, 2006

JON W. DUDAS
*Director of the United States Patent and Trademark Office*